United States Patent [19]

Krüger et al.

[11] 4,306,889
[45] Dec. 22, 1981

[54] ADSORBER DEVICE FOR GAS DRYING AND DESICCANT REGENERATION

[75] Inventors: Rudolf Schäfer, Bad Soden; Christoph Krüger, Pohlheim, both of Fed. Rep. of Germany

[73] Assignees: Pintsch Bamag Gastechnik GmbH, Butzbach; Rudolf Schäfer Ingenieurtechnik GmbH, Königstein both of Fed. Rep. of Germany

[21] Appl. No.: 172,831

[22] Filed: Jul. 28, 1980

[51] Int. Cl.$^3$ .............................................. B01D 53/04
[52] U.S. Cl. ...................................... 55/162; 55/179; 55/387
[58] Field of Search ...................... 55/161–163, 55/179, 180, 208, 387, 389; 34/45, 51, 53, 54, DIG. 4

[56] References Cited

U.S. PATENT DOCUMENTS

| | | | |
|---|---|---|---|
| 2,739,664 | 3/1956 | Parks | 55/162 X |
| 2,878,890 | 3/1959 | Cartwright et al. | 55/162 |
| 3,222,849 | 12/1965 | Fischer | 55/163 |
| 3,703,068 | 11/1972 | Wagner | 55/163 X |
| 3,775,946 | 12/1973 | Brazzel | 55/179 X |
| 4,197,095 | 4/1980 | White, Jr. et al. | 55/162 X |

FOREIGN PATENT DOCUMENTS 399680 10/1933 United Kingdom ............... 55/179

Primary Examiner—Robert H. Spitzer
Attorney, Agent, or Firm—Wells & Wells

[57] ABSTRACT

An adsorber device for drying compressed gas comprises a first and a second chamber which operate alternately on drying and on regenerating the desiccant contained in the chambers. Regenerating is accomplished by branching-off a partial flow of dried gas at the outlet side of the chamber operating on drying and supplying the partial gas flow to the chamber working on regenerating. Means are provided for limiting the branched-off partial gas flow to the gas volume actually needed for regenerating. Embodiments are described wherein this gas limiting is accomplished with a constant partial gas flow prevailing between the two chambers and, further, embodiments are described wherein this partial gas flow is adjusted in accordance with the main gas flow through the chamber working on drying.

6 Claims, 6 Drawing Figures

ADSORBER DEVICE FOR GAS DRYING AND DESICCANT REGENERATION

BACKGROUND OF THE INVENTION

The present invention relates to a device for adsorptive drying compressed gas in an adsorber and regenerating the desiccant contained therein in a continuous operation.

Adsorbers of this type are known to comprise a first chamber and a second chamber, both of which containing the desiccant for adsorptive gas drying. One of the chambers is always connected to the gas flow from the compressor to the consumer while the other undergoes a regenerating phase of the desiccant.

This is accomplished by a first pneumatic changeover valve which connects the inlet of either the first chamber or the second chamber to the mains conveying the gas to be dried, and by a second pneumatic changeover valve which connects the outlet of either the first chamber or the second chamber to the mains through which the dry gas flows to the consumer.

Further, there is provided a choke joint interconnecting the outlet sides of the first and second chamber. The inlet side of each chamber is provided with a solenoid relief valve.

These elements, in combination with a timing mechanism for controlling the solenoid valves, permit a continuous drying and regenerating operation in cycles in such a way that always one chamber is engaged in gas drying while, at the same time, the desiccant in the other chamber is regenerated. During this operation, reversal of the pneumatically operated changeover valves is tripped, utilizing control pulses transmitted from the timing mechanism, closing the relief valve of the chamber being in the regenerating cycle and opening the relief valve of the chamber being in the drying cycle.

In a known device of this type cycle reversal is accomplished in such a manner that the timing mechanism, once the preset operating time has elapsed, causes the closing of the relief valve of the unpressurized regenrating chamber, so as to enable a working pressure to build up above the choke joint. Thereafter, the relief valve of the drying chamber (under working pressure) opens, so as to admit pressure release in this latter chamber.

Inversion of the pressure conditions on both sides of the changeover valves obtained in this manner ensures that the valves are automatically pressed into their reverse operating positions.

The timing mechanism is set to an operating cycle just sufficient to provide drying of the max. gas volume with the max. rate of flow or resp. output from the consumption circuit, for which the desiccant charge is rated. Accordingly the choke joint is designed to be capable of branching off a partial dry gas flow sufficient to regenerate the moisture-laden (and saturated) desiccant within the preset cycle. This means that in a practically applicable case the working cycle is 5 minutes and the partial flow is 0.15 of the max. rate of flow at a prevailing working pressure of 7 bar.

Devices of this type have, however, the following disadvantage: Occurence of the max. rate of flow is quite rare in practice. The actual rates of gas flow during the fixedly preset cycle are essentially lower and, as a matter of fact, vary between 30% and 70% of the max. rate of flow. This means likewise that the desiccant is loaded to an accordingly less substantial extent. On the other hand, the dry gas flow branched off for regenerating, the volume of which depending on the fixed outlet of the choke and on the constant working pressure prevailing in the drying chamber, has always the constant value $$R = 1.033 \frac{Qmax}{p+1},$$

wherein p represents the working gauge pressure in bar. Consequently only a fractional part of the branched off gas flow is utilized regularly for regeneration. The result is a comparatively high loss of gas and thus a waste of expensive energy.

It is, therefore, the object of the invention to adapt the regenerating gas flow R to the actually consumed volume of gas Q and thus to achieve savings in energy cost.

SUMMARY OF THE INVENTION

According to the invention, the above stated object is attained in a device for adsorptive gas drying of the above indicated type by connecting a metering member ahead of the pneumatic changeover valve at the adsorber inlet side. This metering member measures the rate of gas flow through the chamber just operating on drying and, depending thereupon, adapts operating cycles or respectively rates of gas flow between the two chambers in such a way as to avoid branching off surplus dry gas to the chamber in the regenerating cycle.

In a first embodiment of the invented device the metering member is a gas meter of which the totalizing mechanism is adjustable to a desired rate of flow, which is preferably the max. rate of flow. Once same is reached, this mechanism opens the solenoid relief valve of the chamber in the drying cycle, after previously the timing mechnism set to the actual duration of regeneration cycle has closed the solenoid relief valve of the regenerating chamber.

This makes the operating cycles of the respective drying chamber variable in dependence on the gas meter. Preferably the cycles are so dimensioned that the max. rate of flow Qmax is obtained. Thus the max. regenerating rate R can be admitted to the regenerating chamber. The regenerating chamber cycle is, however, maintained to the required fixed value, in dependence on the timing mechanism. The regenerating cycle thus obtained is practically always shorter than that of the drying chamber, which in the case of low consumption rates remains essentially longer in operation.

In a further embodiment of the invention the metering member, instead of totalizing, measures the rate of gas flow being passed through in the moment, and instead of the fixed choke a butterfly valve is provided which is constantly readjusted according to the flow measured.

To this end an orifice plate may be connected ahead of the changeover valve at the adsorber inlet side, whereof the differential pressure pneumatically adjusts the butterfly valve in the opening and closing sense, for example, over a pneumatically connected controller.

In a still further embodiment a control flap may be accomodated in the gas stream as the measuring element. Under the influence of the gas stream the flap performs variable deflections which, in turn, accordingly influences the butterfly valve, for example, over a mechanical control arrangement.

In the last two embodiments, with decreased gas consumption, the partial stream for regeneration is decreased accordingly. As a result the two solenoid valves can be operated by the timing mechanism at short intervals, one after the other, without consuming an expensive surplus of regenerating gas.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
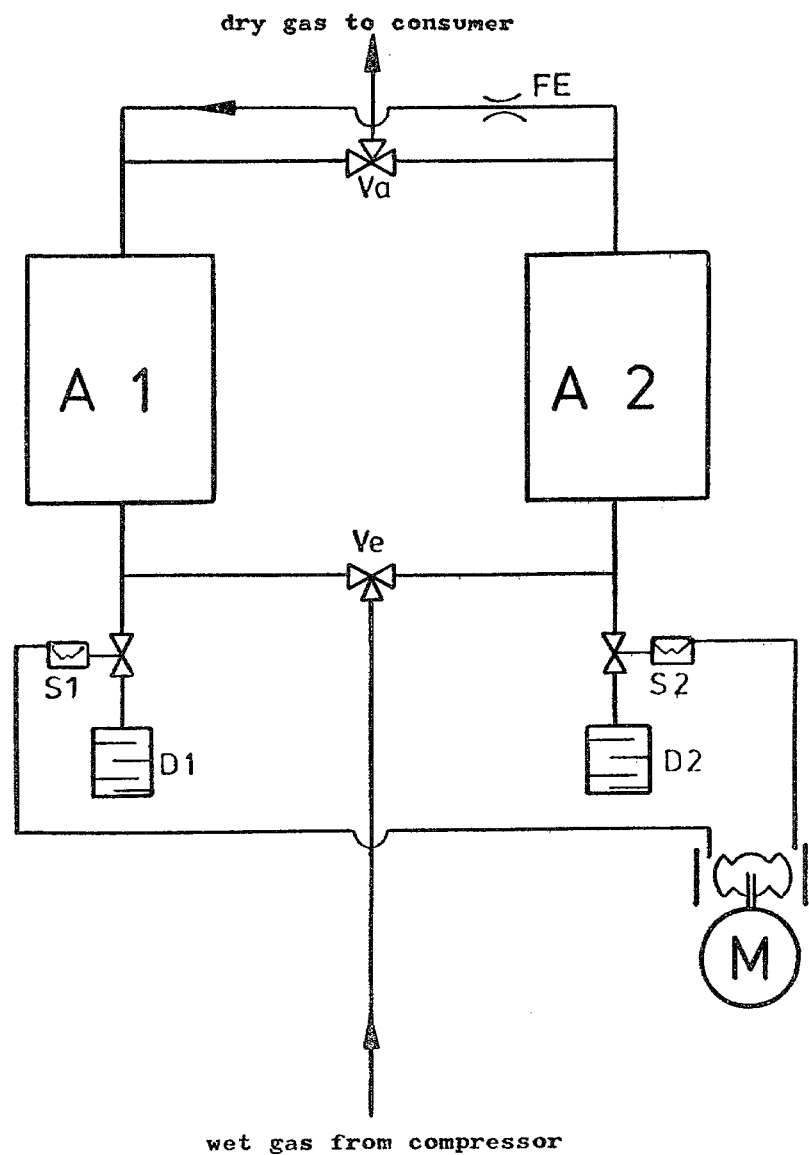
FIG. 1 shows schematically a drying device according to the prior art.

Referring now to the drawings, the prior art drying adsorber shown in FIG. 1, operating on pressure cycling, comprises a first and a second chamber A1 and A2, alternating on drying and regeneration. Over a pneumatically controlled changeover valve Ve at the adsorber inlet side the gas to be dried is passed into one of the chambers, for example into chamber A2, under a given working pressure. In the chamber the gas is dried to a pressure dew-point of at least $-40°$ C. (233 K), whereupon it is passed to the consumers mains over the pneumatically controlled changeover valve Va at the adsorber outlet.

A partial dry gas flow serving for regeneration is released in pressure down to atmospheric pressure by a nozzle or resp. choke FE and is then passed over the desiccant to be regenerated in the chamber A1. Thereafter the gas leaves the chamber, saturated, over the solenoid controlled relief valve S1 and a silencer D1. For parallel chamber A2 there is a relief valve 52 and a silencer D2. The gas stream continuously branched off for regeneration, over the choke FE, depends on the working pressure and the choke design, which means that it is constant. The choke design is based on the assumption that the drying chamber A2 is operating on max. gas volume Qmax to be handled by the desiccant charge is to be passed through it within the shortest possible period of time, within which the regeneration of the desiccant in the chamber A1 has to be performed, too.

Drying in A2 and regenerating in A1 are therefore finished after the elapse of the said cycle as preset by the timing mechanism M. This is achieved by pulses of current from the timing mechanism M which closes the solenoid relief valve S1 and opens the solenoid relief valve S2 shortly thereafter. This causes a pressure rise in A1 and a pressure drop in A2 and means an inversions of the pressure conditions prevailing on both sides of the changeover valves Ve and Va. Thereby these valves are pneumatically changed over. As a result, drying starts in A1 and regeneration in A2.

A synchronous motor in the timing mechanism M drives cam discs having adjustable contact transmission. The cam discs control the solenoid relief valves S1 and S2 over pulses of current, thus determining the operation cycles. Since pressure cycling, which is a heat-less process, is a surface adsorption with short charging periods, the operation cycle of the adsorber is approximately 10 minutes, i.e. 5 minutes for drying and 5 minutes for regeneration.

Figure 2:
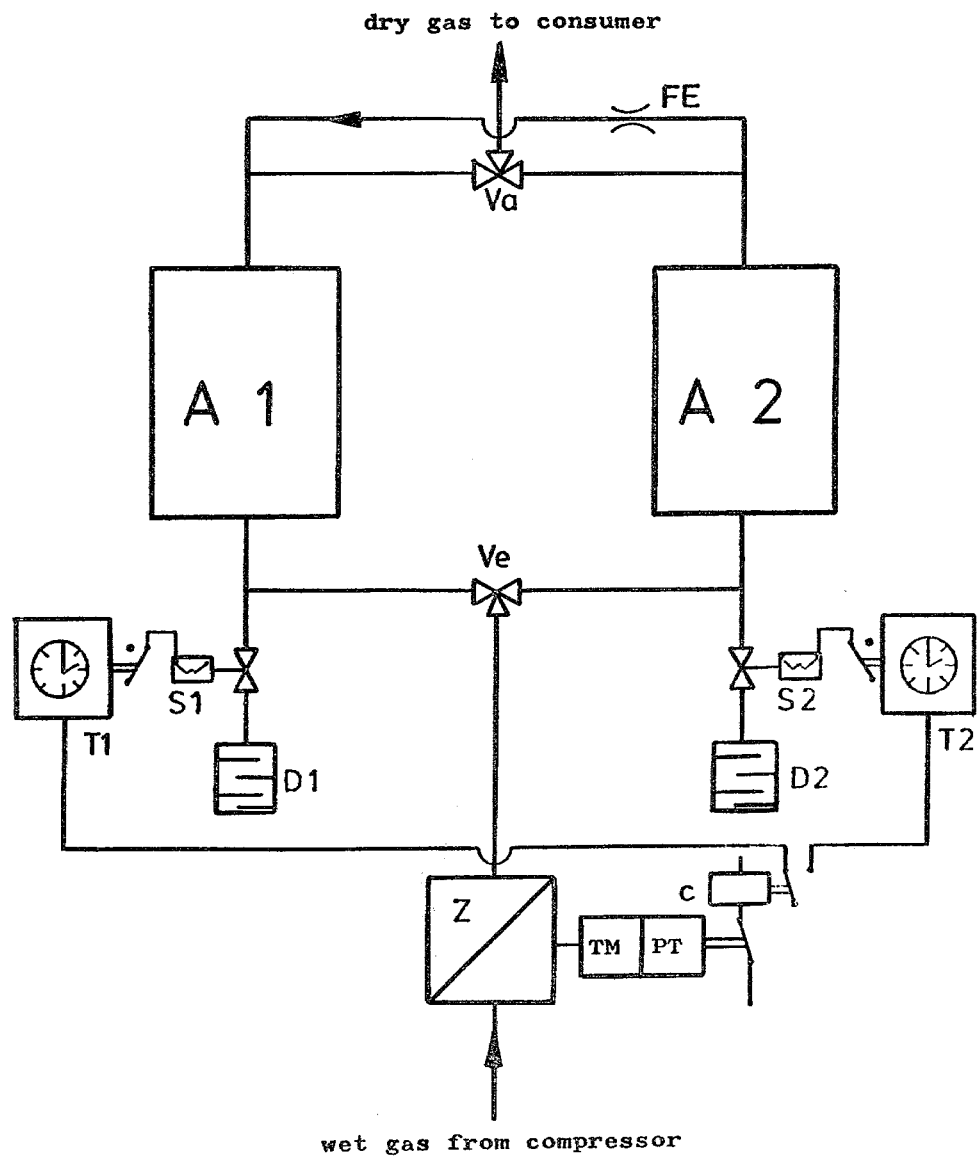
FIG. 2 shows a first embodiment of the invented device.

The embodiment of the invention shown in FIG. 2 is characterized in that the two solenoid relief valves S1 and S2 are alternately actuated by the gas meter Z, the totalizing mechanism of which being equipped with a pulse transmitter, via a latching relay C. Additionally each one is depending on one timing mechanism T1 or T2, respectively. The arrangement is such that, as soon as the fully laden desiccant in chamber A1, for example, is readily regenerated, its relief valve S1 is being closed by the timing mechanism T1, so that the working pressure is obtained in this adsorber. This condition is then maintained over a certain, possibly longer, period of time, till the adsorber in the drying cycle A2 has received the volume of gas as preset by the gas meter Z. Thereupon the relief valve S2 of same will be opened by pulse from the gas meter Z over the relay C. The pressure in the chamber will then be released.

At this very moment, changeover of the changeover valves Ve and Va is taking place as described above, whereupon rich gas (wet gas) is admitted to the chamber A1 and a partial stream of dry gas is guided to the chamber A2. This partial stream is again proportioned in such a way that regeneration in chamber A1 will be performed within the shortest possible time required for passing-through of the total volume in the case of max. consumption in the chamber A2. This partial stream is, however, interrupted after finalizing of regeneration so that, in spite of continued load of the desiccant in Chamber A2, no surplus of regenerating gas will be consumed in chamber A1.

Figure 3:
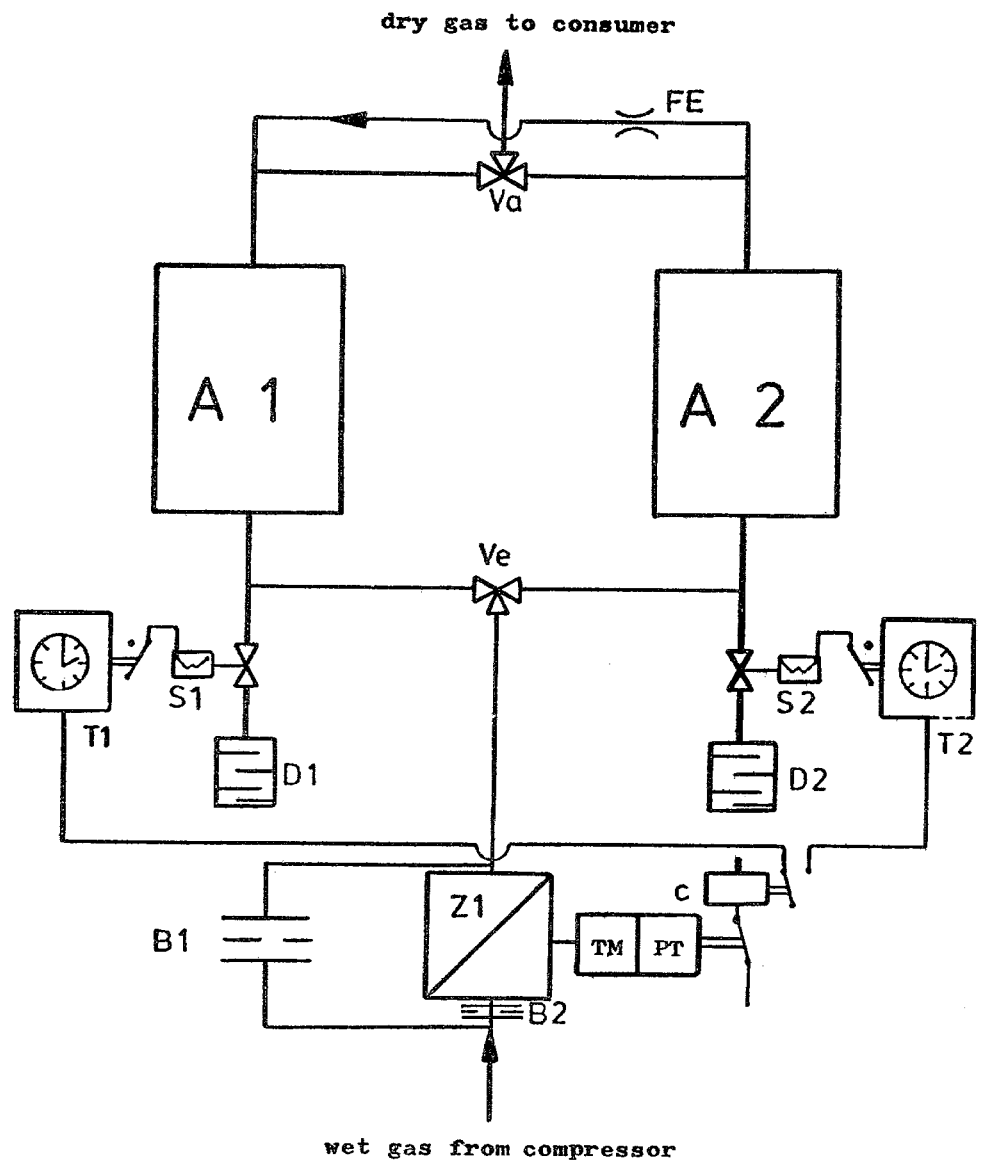
FIGS. 3 and 4 show two modifications of the embodiment of FIG. 2.

FIG. 3 shows a modification of the embodiment shown in FIG. 2. Instead of a meter to which the full gas flow is admitted, a partial flow meter Z1 of some known make is provided. This partial flow meter is arranged in parallel connection with an orifice plate B1 and allows the use of a meter of accordingly smaller design. An orifice plate B2 ahead of the partial flow meter Z1 represents the inherent resistance, however it may be omitted in this arrangement.

Figure 4:
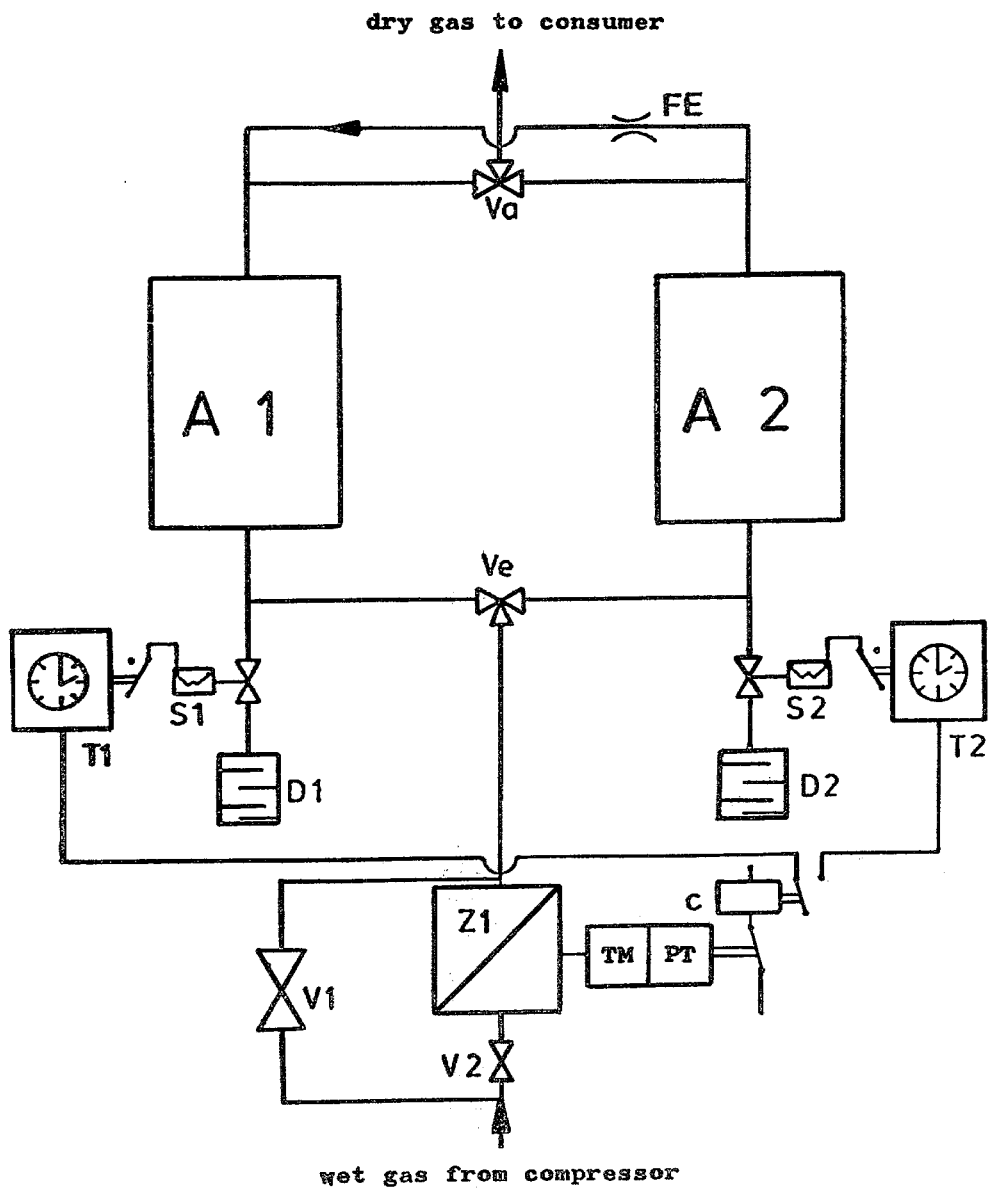

In the embodiment shown in FIG. 4 the orifice plates B1 and B2 are replaced by valves V1 and V2. These valves are adjustable and allow the adapting of the partial flow meter Z1 to an unlimited main gas stream.

In a quite identical manner as in case of the meter in the embodiment shown in FIG. 2 the partial flow meter Z1 is equipped with a pulse transmitter PT being arranged subsequent to the totalizing mechanism TM. This transmitter, over a latching relay C opens the solenoid relief valve S1 or S2 of the chambers A1 or A2, respectively, whichever is operating on drying. Closing of the chamber A1 or A2, whichever is at the moment operating on regenerating, is performed by the associated timing mechanism T1 or T2, respectively.

Figure 5:
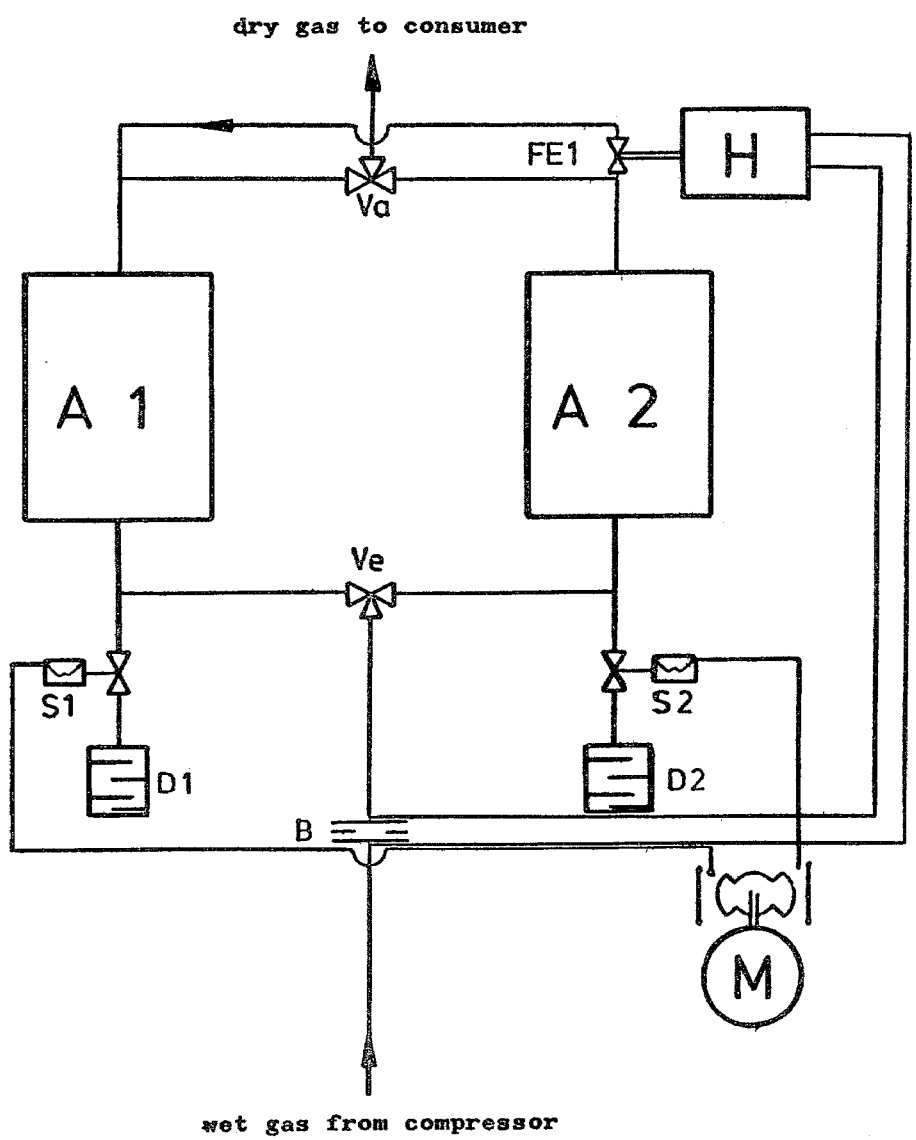
FIG. 5 shows a further embodiment of the invented device.
Figure 6:
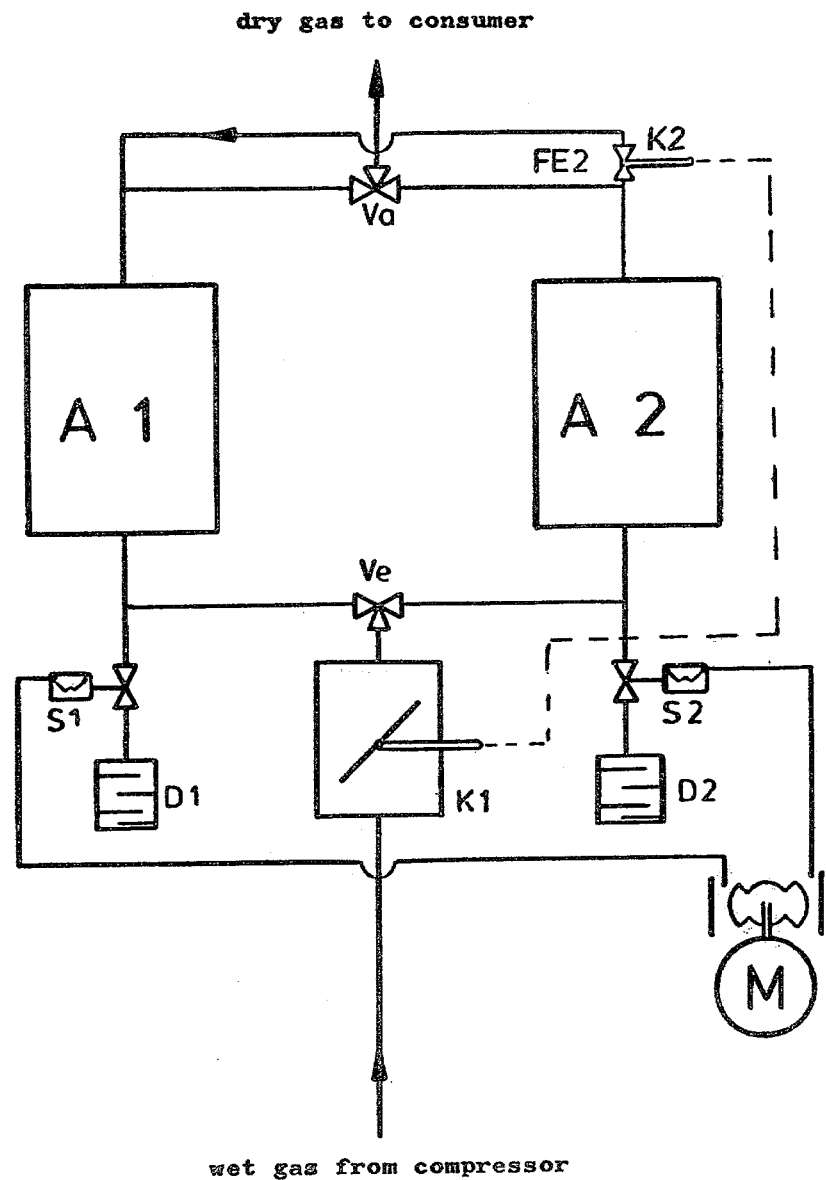
FIG. 6 shows a third embodiment of the invented device.

In the embodiments according to the FIGS. 5 and 6 the fixed choke FE of the embodiments of FIGS. 1-4 has been replaced by adjustable butterfly valves FE1 or FE2, respectively. These valves are designed to vary the rate of the gas flow branched off for regeneration in a constant or resp. proportionate way with respect to the main gas flow.

According to FIG. 5 this is achieved by means of an orifice plate B being connected ahead of the inlet changeover valve Ve. The orifice plate B provides resetting of the butterfly valve FE1, for example, over a pneumatically connected control element H.

In the embodiment of FIG. 6, instead of the orifice plate B there is arranged a control flap K1 ahead of the inlet changeover valve Ve, reacting on flow variations by variation of its angle of deflection. The flap K1 controls the butterfly valve FE2, for instance over a mechanical coupling K1-K2.

In both modifications the solenoid valves S1 and S2 of the two chambers depend on the timing mechanism M, from where they are actuated in conformity with a fixed operating cycle, i.e. they are opened and closed resp. in the required sense. Duration of this operating cycle of the two chambers is preferably based on the time being sufficient or resp. required to charge and regenerate the desiccant charge with the full rate of flow. The time for drying and regenerating may be equally long. In this instance, no unnecessary surplus consumption of regenerating gas will occur, since the volume of the regenerating gas is always preset to be proportional to the drying gas volume.

The invention includes the possibility of applying the effectively consumed volume of gas according to the embodiments of the FIGS. 2, 3, and 4 also for use in adsorptive dryers with heat regeneration.

What is claimed is:

1. An adsorber device with a desiccant for drying compressed gas and for regenerating the desiccant in a continuous operation in mains between a gas compressor and a gas consumer, the device comprising a first and a second chamber having inlet and outlet sides loaded with the desiccant, and a pressure-operated pneumatic changeover valve each at the inlet side and at the outlet side of the chambers for alternately connecting one of the chambers to the gas flow to be dried between the compressor and the consumer, a first solenoid relief valve at the inlet side of the first chamber and a second solenoid relief valve at the inlet side of the second chamber, a timing mechanism for generating electric pulses for operating the relief valves, and a choke connection between the outlet sides of the first and second chamber for branching off and supplying a portion of the dry gas for regenerating the desiccant in the respective other chamber, the alternate connection of the chambers into the flow of gas to be dried being accomplished by alternately opening and closing the solenoid relief valves, thereby generating alternating pressure conditions in the first and the second chamber for reversing the operating positions of the pneumatic changeover valves, wherein the improvement comprises a. a gas metering member arranged ahead of the pneumatically operated changeover valve at the inlet side of the first and second chamber for measuring the rate of gas flow,
b. a totalizing mechanism included in the gas metering member, the mechanism generating electric pulses when the gas flow through the metering member reaches a predetermined volume,
c. a latching relay connected between the totalizing mechanism and the first and second solenoid relief valve, the relay opening alternately the first and the second valve upon receiving a pulse from the totalizing mechanism,
d. a first and a second timing mechanism connected to the first and the second solenoid relief valve, respectively, for closing the valve after a predetermined time phase has elapsed after valve opening, the timing mechanism being started to run by the valve opening pulse, the arrangement being such that (1) the choke connection between the outlet sides of the first and second chamber is adjusted for branching off and conducting a partial flow of the dry gas to the chamber operating on regenerating that is capable of accomplishing complete desiccant regeneration within that period of time that is required to reach the predetermided volume to which the totalizing mechanism is set when the maximum rate of gas flow is transmitted through the chamber operating on drying, and (2) the time phase to which the timing mechanism is set for closing the solenoid relief valve after opening is equal to the said period of time.

2. The adsorber device as claimed in claim 1, wherein the volume to which the totalizing mechanism is set for generating electric pulses is adjustable.

3. The adsorber device as claimed in claim 1, wherein the gas metering member is a partial flow meter connected in parallel to the changeover valve and wherein an orifice plate is arranged in the gas mains.

4. The adsorber device as claimed in claim 3, wherein a further orifice plate is provided ahead of the partial flow meter.

5. The adsorber device as claimed in claim 1, wherein the gas metering member is a partial flow meter connected in parallel to an adjustable changeover valve being arranged in the gas mains.

6. The adsorber device as claimed in claim 5, wherein a further adjustable valve is arranged ahead of the partial flow meter.

* * * * *